March 7, 1939.  F. L. JOHNSON  2,149,604
COLLAPSIBLE FORM
Filed Feb. 2, 1937  5 Sheets-Sheet 1

INVENTOR
FRANK L. JOHNSON
BY Albert L. Ely
ATTORNEY

March 7, 1939.  F. L. JOHNSON  2,149,604
COLLAPSIBLE FORM
Filed Feb. 2, 1937  5 Sheets-Sheet 2

INVENTOR
FRANK L. JOHNSON
BY
Albert L. Ely
ATTORNEY

March 7, 1939. F. L. JOHNSON 2,149,604
COLLAPSIBLE FORM
Filed Feb. 2, 1937 5 Sheets-Sheet 4

INVENTOR
FRANK L. JOHNSON
BY Albert L. Ely
ATTORNEY

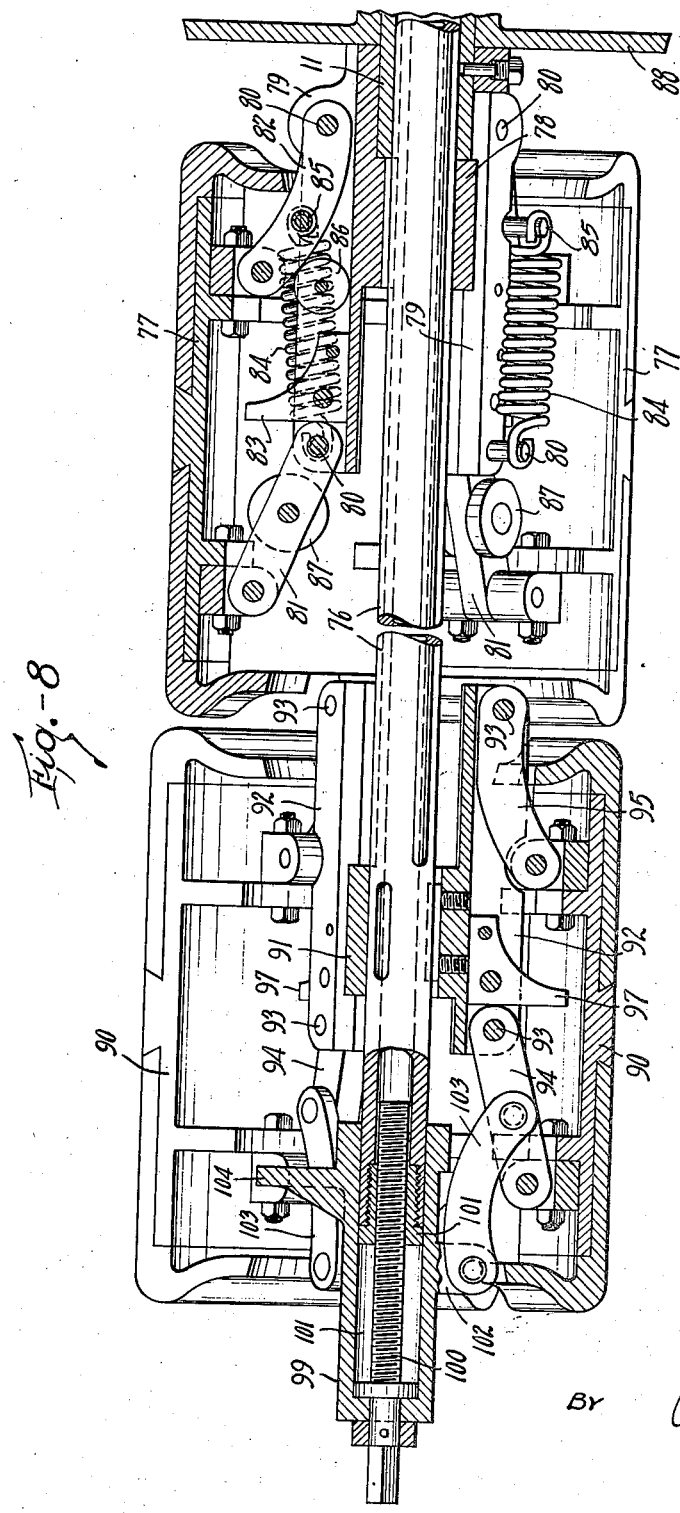

Patented Mar. 7, 1939

2,149,604

UNITED STATES PATENT OFFICE 2,149,604

COLLAPSIBLE FORM

Frank L. Johnson, Akron, Ohio

Application February 2, 1937, Serial No. 123,625

19 Claims. (Cl. 154—9)

This invention relates to collapsible forms and more especially it relates to collapsible forms of the drum type such as commonly are used in the fabrication of pneumatic tire casings.

Briefly stated, the improved drum is of the segmental type and comprises groups of radially movable sections of which one group is movable axially out of the operative plane of the tire to effect maximum collapse of the drum.

The chief objects of the invention are to provide an improved collapsible form of the character mentioned; that may be collapsed more quickly than similar drums heretofore provided, thus saving time; that is of rugged construction and provides accuracy of dimension; that has its operative mechanism enclosed, thus making for safety of the operator; and that readily may be altered for the manufacture of tires of different diameter and widths. More specifically the invention aims to provide a tire building drum of the character mentioned wherein the moving of one group of drum sections out of the operative plane of the drum automatically effects the collapse of the other group of drum sections. Other objects will be manifest as the specification proceeds.

Of the accompanying drawings,

Fig. 8 is a view of the parts shown in Fig. 6 as they appear in the fully collapsed condition of the drum.

Figure 1:
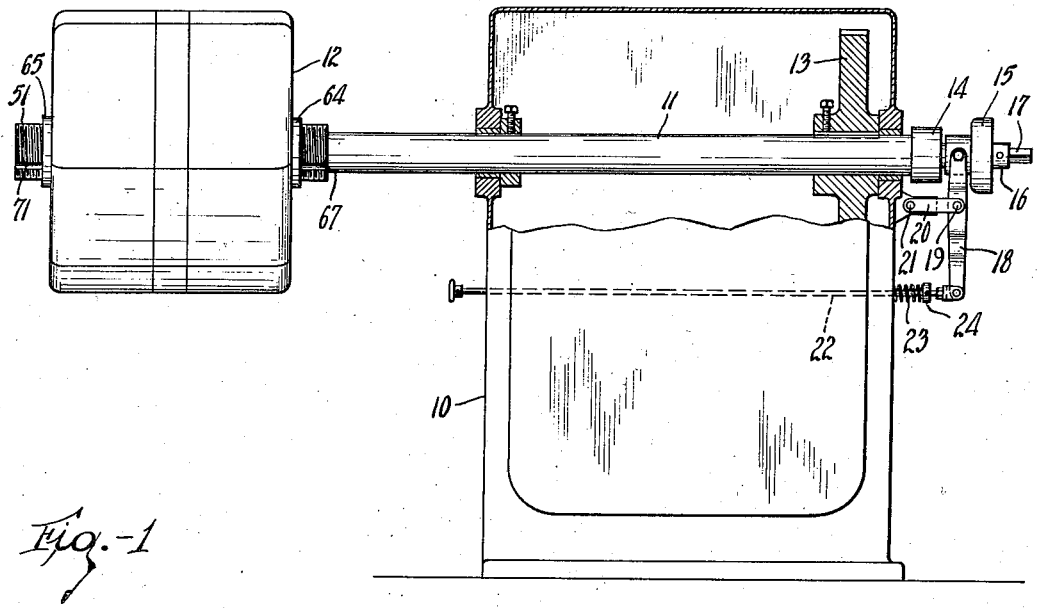
Fig. 1 is a side elevation of a tire building machine including the improved drum, a part being broken away and in section to show the drive mechanism of the drum.

Referring to Fig. 1 of the drawings, there is shown a tire building machine comprising a housing 10 in which is journaled a horizontal sleeve or quill 11 that extends completely through the housing and upon its front end carries the improved collapsible tire building drum generally designated 12. For driving the quill 11 the usual motor (not shown) is provided within the housing 10, said motor being under control of the operator and driving the quill through the agency of a gear 13 that is mounted upon the latter. Coaxially mounted upon the projecting rear end of the quill 11 is a short tubular bushing 14 of reduced diameter, and journaled for axial movement thereon is a non-rotatable element 15 of a cone clutch, the other element 16 of said clutch being mounted upon the rearwardly projecting end portion of a shaft 17 that is journaled within said bushing 14 and which normally rotates with the quill 11. Engaged with clutch element 15 is a forked shipper lever 18 that is fulcrumed at 19 upon the free end of a short link 20 that is pivotally mounted at 21 in a bracket formed on the rear wall of the housing 10. To the lower end of the shipper lever 18 is connected an operating rod 22 that extends through the housing 10 to a point in front of the latter for the convenience of the operator. A compression spring 23 mounted upon the rod 22 between the rear wall of the housing and a collar 24 on the rod normally urges the latter rearwardly to maintain the cone clutch in open position whereby the quill 11 and shaft 17 rotate in unison. Closing of said clutch results in member 15 acting as a brake to prevent rotation of the shaft 17 so that there is relative angular movement between the latter and the quill. The rear end of shaft 17 is squared, as shown in Fig. 1, to receive a suitable tool, such as a crank, by which it manually may be rotated, upon occasion, if desired.

Figure 3:
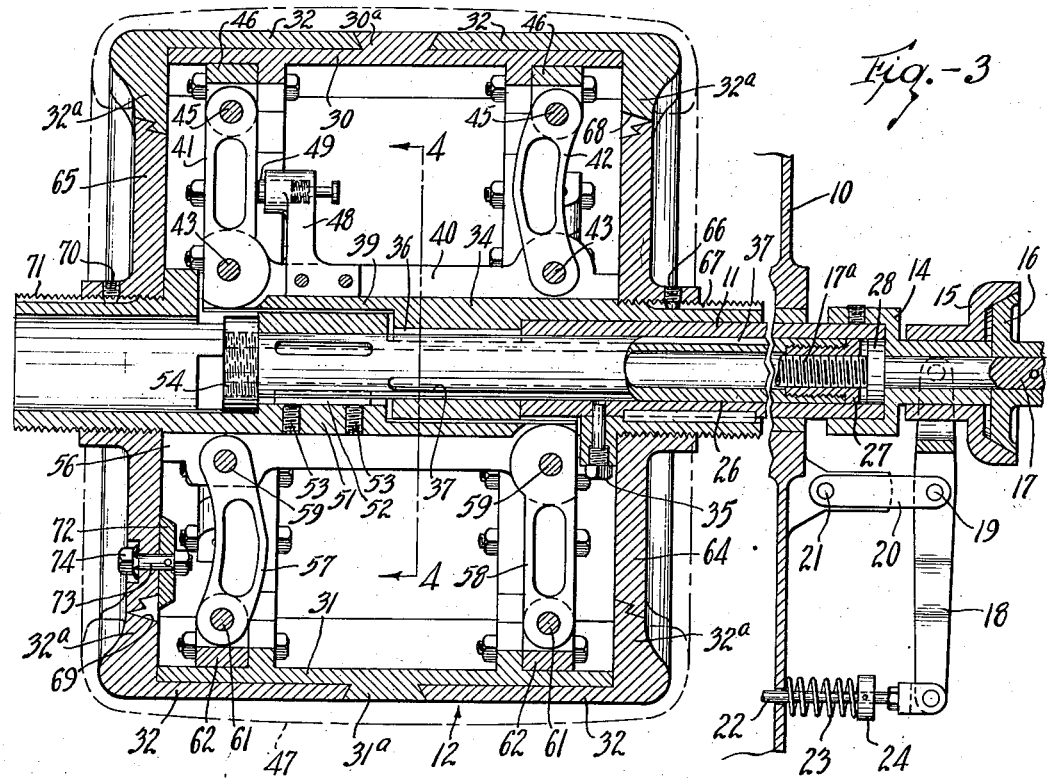
Fig. 3 is a section on the line 3—3 of Fig. 2.
Figure 5:
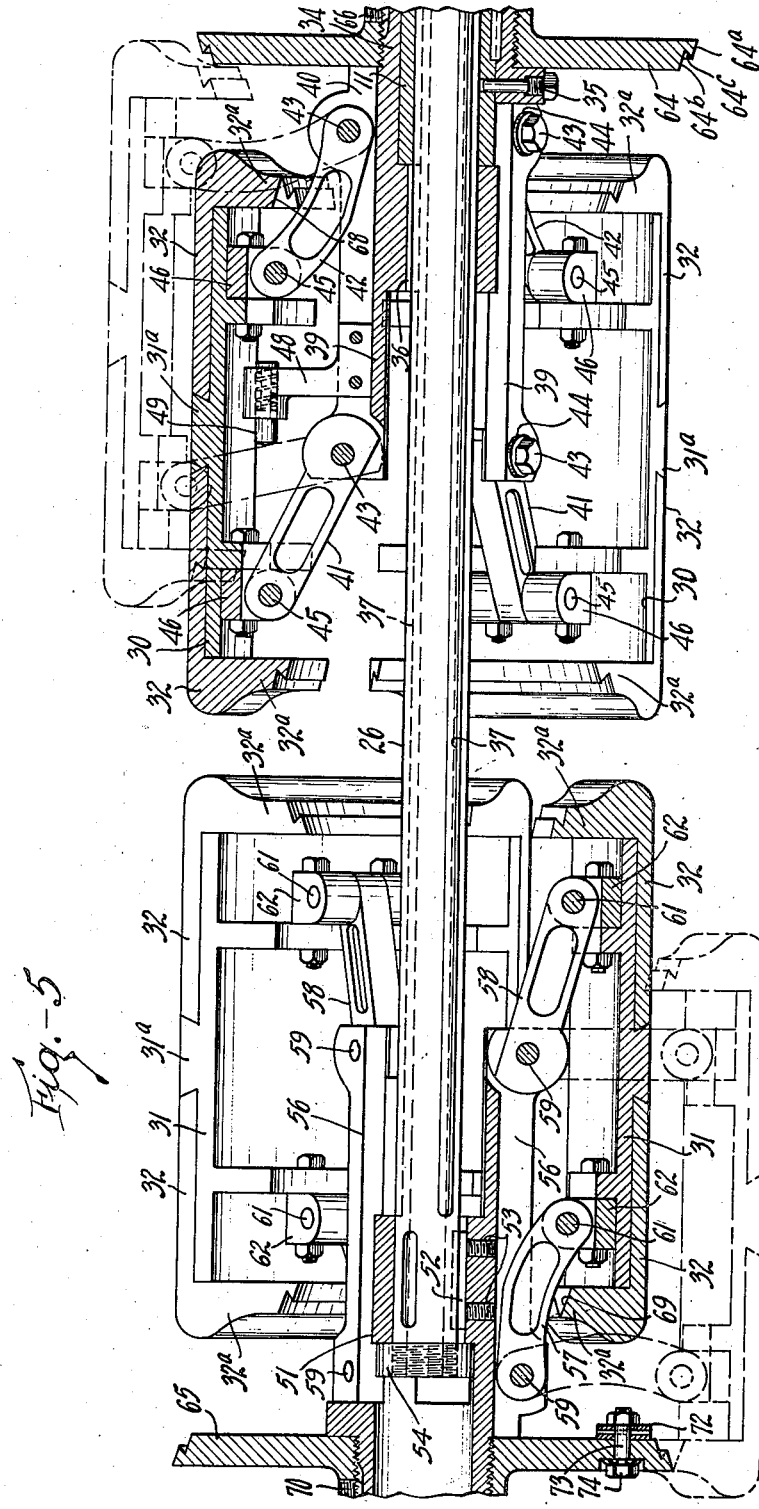
Fig. 5 is a diametric section of the drum as it appears in fully collapsed condition, with one group of sections moved forwardly out of the operative plane of the drum.

Slidably mounted for axial movement within the quill 11 is a tubular spindle 26 that projects beyond the front end of the quill 11, as is most clearly shown in Fig. 3. The spindle 26 carries that group of drum sections that are movable out of the plane of operative continuity of the drum, as shown in Fig. 5. For effecting axial movement of the spindle 26, the rear end thereof has a nut 27 fixedly secured therein, said nut being formed with a female thread for receiving the forward portion of the shaft 17, said forward portion being formed with threads as shown at 17ª, Fig. 3. The arrangement is such that relative angular movement of the quill 11 and shaft 17 will effect forward or rearward axial movement of spindle 26 according to the direction of rotation of said quill, the portion 17ª being of sufficient length to effect the required axial movement of the spindle. The shaft 17 is formed with a flange 28 that abuts a shoulder on the bushing 14 for preventing axial movement of said shaft.

Figure 2:
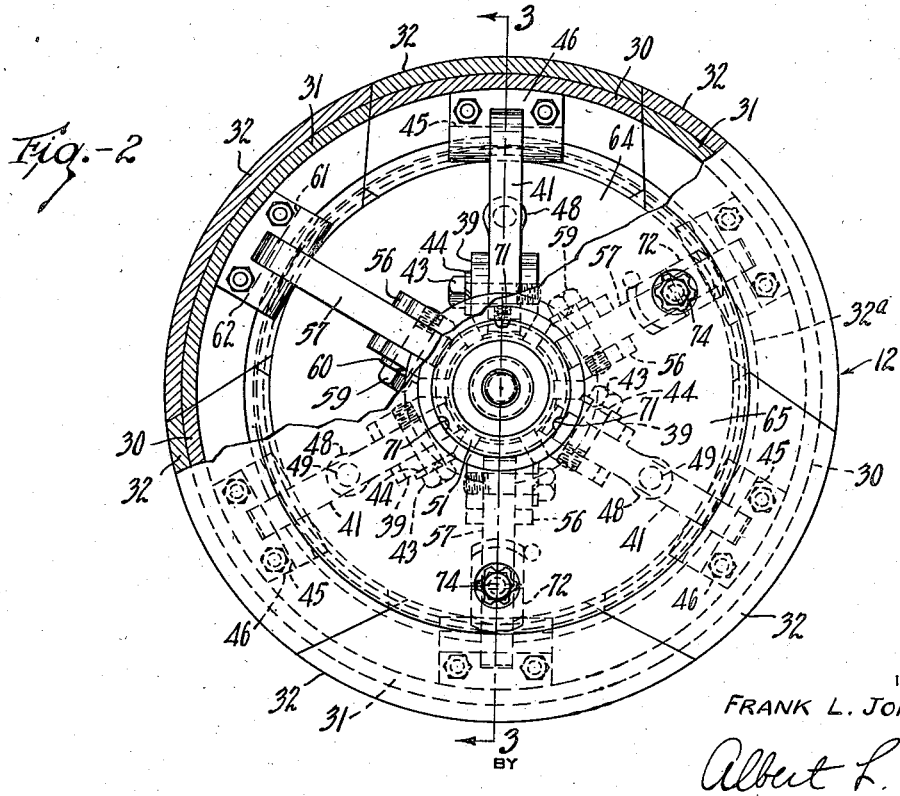
Fig. 2 is an end elevation of the improved drum, in its preferred form, as viewed from the left of Fig. 1, a part being broken away and in section.

As is most clearly shown in Fig. 2, the drum 12 comprises three key sections designated 30, 30, and three intermediate sections designated 31, 31, each of said sections being formed on its outermost surface with a central, laterally undercut rib 30ª or 31ª. Each drum section also has mounted on its outer surface a pair of plates 32, 32 that cover said surface laterally of the central rib and have angular lateral extensions 32ª that extend radially inwardly and constitute seats for the bead portions of a tire that is built upon the drum. Each plate 32 is of substantially the same circumferential extent as the drum section that carries it, so that the plates provide a continuous working surface in the expanded condition of the drum. The plates 32 are secured to the drum sections in the usual or preferred manner, and may be replaced by other plates of suitable size for the manufacture of tires of different size.

The key sections 30 of the drum 12 are carried by a hub structure 34 that is tubular in form, said hub structure being mounted upon the forward end portion of the quill 11 and upon the spindle 26 that projects therefrom. The hub 34 is secured in fixed relation to the quill 11 by means of a screw-stud 35 that is threaded into the hub structure and projects therethrough into a suitable bore or socket in the quill. That portion of the hub structure that fits about the spindle 26 has non-rotative engagement with the latter by means of a plurality of keys 36, 36 seated in suitable keyways in the respective members, the keyways 37 in the spindle being elongate, as shown in Figs. 3 and 5, to permit axial movement of the spindle relatively of the hub structure.

Figure 4:
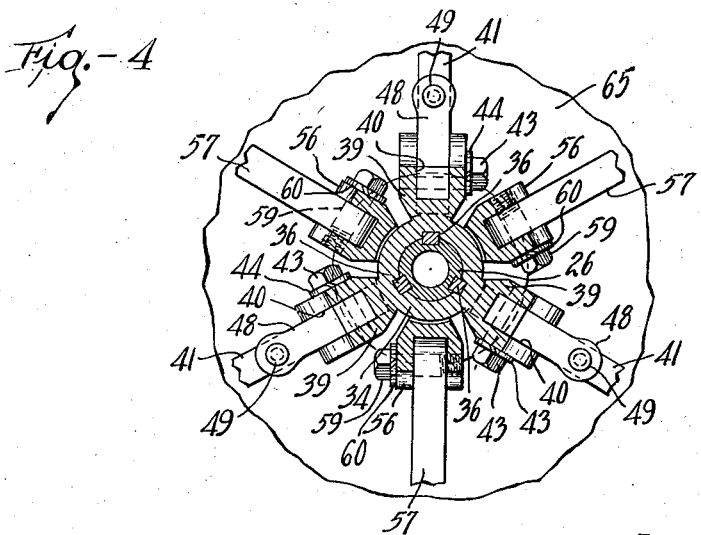
Fig. 4 is a section on the line 4—4 of Fig. 3.

The hub structure 34 comprises three radially disposed ribs 39, 39 that extend longitudinally thereof throughout the forward half of its length, and extend forwardly beyond the front end of the hub, in overhanging relation thereto. The ribs 39 are symmetrically arranged about the hub structure, and at their juncture with the latter are slightly undercut, as best shown in Fig. 4, for a purpose presently to be explained. Each rib 39 is radially slotted at 40, in its outermost face, throughout its length, said slot receiving the inner end portions of a pair of links 41, 42, which links are pivoted, at opposite ends of said slot, upon respective pivot pins 43, 43. The pivot pins carry friction means, such as the spring washers 44, that bear against the pivot portions of ribs 39 whereby the links are yieldingly and frictionally gripped so that they will not swing about their pivots 43 unless positively forced so to do. Each pair of links 41, 42 supports one of the key sections 30 of the drum 12, and to this end the outer ends of the links are pivotally connected at 45, 45 to respective brackets 46, 46 that are bolted to radial ribs formed on the inner peripheral surface of each of said sections. The arrangement constitutes a parallel motion mechanism by which each key section 30 of the drum may be moved forwardly, relatively of its hub 34, and concurrently moved radially inwardly while maintaining its normal position parallel to the axis of the drum. In Fig. 5 the drum sections are shown as they appear after being moved inwardly, and in this position all points of the sections are disposed inwardly of the smallest diameter of a tire that may be built upon the drum, thereby permitting the tire to be moved axially over said sections during removal of the tire as subsequently will be explained. The outline of such a tire is shown in broken lines at 47, Fig. 3. Mounted in each slot 40, behind link 41, is a bracket 48 in the outer end portion of which is mounted an axially movable stud 49 that normally is urged toward the said link 41 by a compression spring within the bracket. The purpose of the studs 49 is to prevent the key sections 30 from being moved fully into operative position, as shown in Fig. 3 by other than mechanical power. Thus if the collapsed key sections are manually moved outwardly, or if they are thrown outwardly by the centrifugal force of the rotating drum, the studs 49 will be engaged by the links 41 in the position shown in broken lines in Fig. 5, and the sections will be retained in this partly expanded position until they are subsequently moved farther, against the force of the spring-pressed studs, by mechanically applied force as subsequently will be explained.

The intermediate sections 31 of the drum 12 are carried by a hub structure 51 that is tubular in form, said hub structure being mounted upon the forward end portion of the hollow spindle 26, and secured thereto by a plurality of keys, such as the key 52, each of said keys being engaged by two set-screws 53, 53 that extend through the hub for the purpose of preventing axial movement of the hub relatively of said keys. There is also a collar or flange 54 threaded onto the forward end of the spindle 26 for assisting the set-screws 53 in retaining the hub against movement relatively of the spindle.

The hub structure 51 comprises three radially disposed ribs 56, 56 that extend longitudinally thereof throughout the rearward half of its length, and extend rearwardly beyond the rear end of the hub in overhanging relation thereto. Said ribs are arranged symmetrically about the hub structure, and the latter is so angularly positioned that in the operative position of the drum the ribs 56 are intercalated with the ribs 39 of hub 34, as shown in Figs. 3 and 4. At their juncture with the hub the ribs 56 are slightly undercut, as shown in Fig. 4, to provide clearance with said ribs 39. Each rib 56 is radially slotted throughout its length in the same manner as ribs 39, which slot receives the inner end portions of a pair of links 57, 58, which links are pivotally mounted in opposite ends of the slot upon respective pivot pins 59, 59. The latter include friction means such as the spring washers 60 that are identical with and serve the same purpose as the washers 44. Each pair of links 57, 58 supports one of the intermediate drum sections 31, and to this end the outer ends of the links are pivotally connected at 61, 61 to respective brackets 62, 62 that are bolted to radial ribs formed on the inner peripheral surface of each of said sections. The arrangement is such that when the hub 51 and intermediate drum sections 31 have been moved forwardly out of the operative plane of the drum, the sections may then be swung rearwardly and concurrently inwardly toward the spindle 26, as shown in Fig. 5, a sufficient distance to permit a finished tire casing to be moved axially thereof and thereby removed from the drum.

To impart added rigidity to the drum and to conceal the interior thereof, it is provided at its respective ends with closure plates 64, 65. Closure plate 64, located at the inner or rear end of the drum, is threaded onto the rear end of hub 34 and secured against angular movement thereon by a setscrew 66 that passes through the hub of the plate and engages in one of a plurality of longitudinal slots 67 formed in the threaded portion of hub 34. The perimeter of closure plate 64 is formed with two, radially spaced, beveled or forwardly tapered surfaces 64a, 64b, each of less width than the thickness of the plate and connected by a reversely tapered surface 64c that undercuts the outer beveled surface. The inner peripheral faces of the radial extensions 32a of drum-section plates 32 are formed with beveled surfaces complemental to those on the plate 64 so as to interlock therewith in the expanded, operative condition of the drum, as shown in Fig. 3. The inner peripheral faces of the extensions 32a of the key drum sections may be transversely slotted at 68 to receive the links 42 in the fully collapsed condition of said sections, but said slots will be covered and obscured by the plate 64 in the expanded condition of the drum, so that the lateral margins of tire fabric may be trimmed thereagainst. In like manner the extensions 32a at the front end of the intermediate drum sections may be transversely slotted at 69 to receive the links 57 in the collapsed condition of said intermediate sections. The closure plate 65 is essentially identical to plate 64, being threaded onto the forward end portion of hub 51 and retained against angular movement by means of a set-screw 70 that enters one of a plurality of longitudinal slots 71 in said hub. To prevent premature collapse of the intermediate drum sections, means are provided for locking them to the closure plate 65. To this end rotatable latch members 72, 72 are mounted upon the rear face of the closure plate 65 so as to be engageable with the respective drum section extensions 32a to hold them in engagement with the closure plate. The latches 72 are mounted upon respective stems 73 that extend through the closure plate and are provided with suitable operating nuts 74 and spring washers on the front of the latter, said operating nuts being engageable with a suitable tool, such as a socket wrench, for turning them.

In the operation of the improved drum, let it be assumed that it is in the expanded, operative position shown in Figs. 1 and 3, with the spring 23 holding the clutch members 15, 16 in spaced apart position. With the drum being driven, through quill 11, by the usual driving motor (not shown), the tire 47 of any known or preferred construction is built upon the drum in the usual manner. When the tire is completely fabricated and it is desired to collapse the drum, the operator sees to it that the drum is rotating in the proper direction, and then pulls on the rod 22, against the pressure of spring 23, to engage clutch members 15, 16, with the result that member 15 acts as a brake to stop rotation of shaft 17. Thus continued revolution of quill 11 and spindle 26 causes the latter to move axially outwardly as the nut 27 threads its way along the threaded portion 17a of stationary shaft 17. Axial movement of spindle 26 carries hub 51 forwardly, hub 34 remaining axially stationary because it is secured to quill 11 by stud 35. Forward movement of hub 51 carries with it the intermediate drum sections 31 and the tire casing 47. Because the latter is engaged with the lateral portions of the key sections 30, the said key sections are dragged forwardly by the tire, and concurrently swung inwardly toward the axis of the drum as the links 41, 42 turn about their pivots 43. This movement of the key sections moves them away from closure member 64. The swinging movement of the key sections is initially assisted by the pressure of the spring pressed studs 49 against the links 41.

The inward and forward movement of the key sections 30 continues until such time as the greatest diameter of the collapsed sections becomes less than the inner periphery of the bead regions of the tire, whereupon the tire moves axially over the collapsed key sections. The still expanded intermediate sections with the tire thereon continue to move forwardly, until they are separated from the key sections sufficiently to permit them to be collapsed. The operator then releases the rod 22 to halt the forward movement of the spindle 26 and shuts off the motor that drives the quill 11, thus bringing the drum to rest. The operator next turns the nuts 74 through an angle of 90 degrees to disengage the several latches 72 from the drum sections 31, and then pushes the tire 47 and intermediate drum sections rearwardly thus causing the latter to swing inwardly toward the axis of the drum, as shown in Fig. 5. The tire may then be removed from the collapsed intermediate sections and passed over the closure plate 65.

To restore the collapsed drum to operative position, the drum sections first are moved outwardly from their collapsed positions, and this may be done manually, or by centrifugal force arising from rotation of the drum. In either event the key sections 30 are moved outwardly only to the position shown in broken lines in Fig. 5, where the spring-backed studs 49 yieldingly prevent further outward movement. The intermediate sections 31 may be moved outwardly to the limit of their outward movement, as indicated in broken lines in Fig. 5, and then secured to the closure plate 65 by the latches 72. The drum is rotated in reverse direction to its direction of rotation during the collapsing phase of operation, and the operator again pulls the rod 22 to cause member 15 to engage member 16 and thus to stop rotation of shaft 17 and its screw 17a, with the result that nut 27 is threaded along said screw and draws spindle 26 with the intermediate sections 31 thereon rearwardly. The latter move easily into position between the key sections 30, which, being in slightly collapsed position, do not touch the intermediate sections and therefore offer no frictional resistance to the movement of the latter. As the intermediate sections 31 approach fully intercalated position, closure plate 65 engages the extensions 32a of the key sections and forces said key sections rearwardly, against the pressure of the spring-backed studs 49, said key sections concurrently moving outwardly to fully expanded position. As the drum becomes fully expanded, the operator releases rod 22 to stop the feed of screw 17a and then shuts off the motor drive of the drum. This completes a cycle of operation and the drum is in condition to have another tire built thereon.

By the moving of both the key sections and the intermediate sections out of the operative plane of the drum, said sections are collapsed to smaller compass than heretofore has been possible. The feature of automatically collapsing the key sections as the intermediate sections move axially saves time and labor and simplifies the construction of the drum. The feature of the closure plates at the ends of the drum makes for safety, adds to the rigidity and ruggedness of the drum, and assures accuracy in the operative positions of the drum sections.

Figure 6:
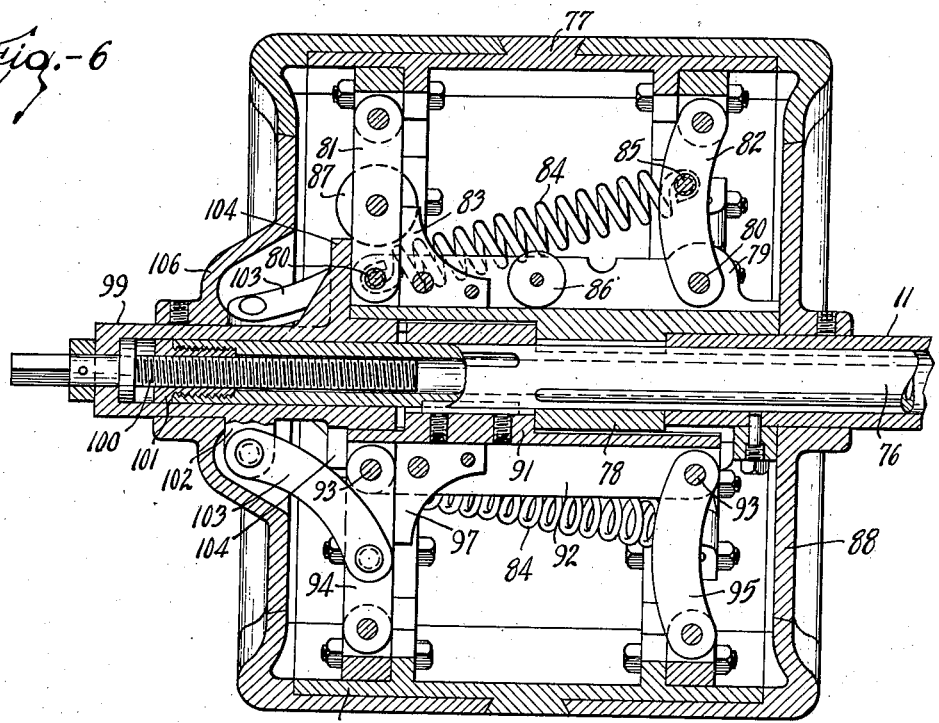
Fig. 6 is a diametric section through a collapsible drum constituting a modified embodiment of the invention.
Figure 7:
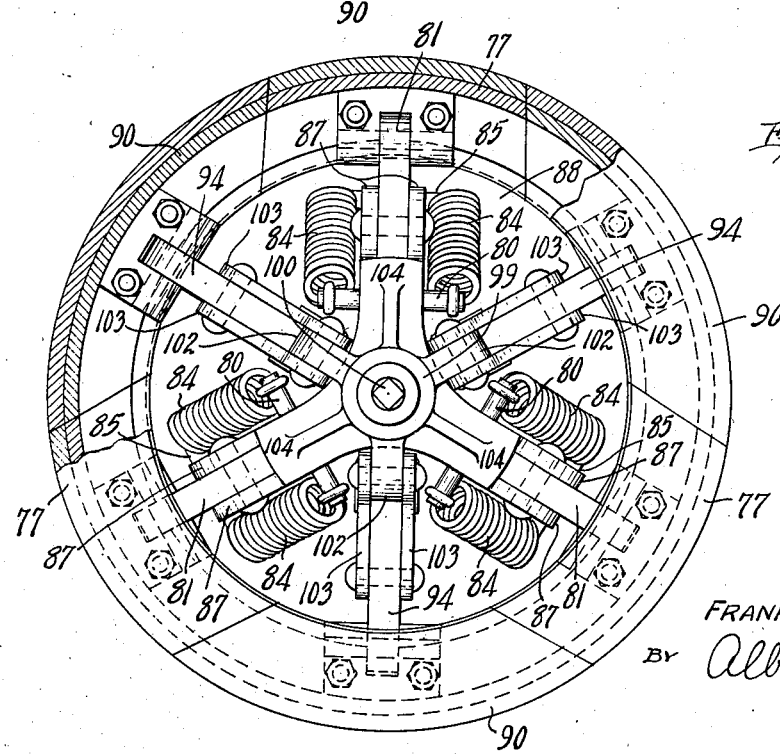
Fig. 7 is an end elevation of the structure shown in Fig. 6, parts being removed and parts being broken away and in section for clearness of illustration.

The modified embodiment of the invention shown in Figs. 6 to 8, inclusive, is essentially the same as that previously described, but includes slightly different means for effecting the collapse of the respective drum sections. The driving mechanism (not shown) including the quill 11 is identical with the previously described driving mechanism. The axially movable spindle 76 that is mounted in said quill is somewhat different as presently will be described. The key sections 77, 77 of the drum are carried by a hub 78 that is mounted upon the forward end of the quill 11 and upon spindle 76, said hub being substantially similar to hub 34 in that it is formed with three longitudinally slotted radial ribs 79, 79. Pivotally mounted in the slot in each rib, at opposite ends thereof and upon pivot pins 80, 80 are links 81, 82 that have their outer ends pivotally connected to a key section 77 of the drum. Mounted in each rib slot, immediately behind forward link 81, is an abutment 83 that prevents the latter from tilting rearwardly of exact radial position. The pivot pin 80 of each forward link 81 projects laterally each side of its hub-rib 79, and connected to each of its projecting end portions is a tension spring 84, the other end of each of said tension springs being connected to the respective projecting end portions of a stud 85 that extends through the link 82 intermediate the ends thereof. The arrangement is such that the springs 84 normally urge the links 82 toward the inclined position shown in Figure 8, in which position the key sections are disposed forwardly of the operative plane of the drum and inwardly toward the axis of the drum. In their forwardly tilted position each link 82 rests upon a cushion-abutment 86 mounted in the slot in its rib 79. In its medial region each link 81 carries a pair of rollers 87, 87 for a purpose presently to be described. The inner end of the drum is provided with a closure plate 88 which may be mounted for axial adjustment upon the quill 11, the perimeter of the closure plate being formed with a simple bevel as shown.

The intermediate sections 90, 90 of the drum are carried by a hub structure 91 that is fixedly mounted upon the spindle 76, forwardly of hub 78 thereon. The hub 91 is substantially similar to hub 51 in that it is formed with three longitudinally slotted radial ribs 92, 92, which ribs extend beyond the ends of the hub and normally are disposed in intercalated relation to ribs 79 of hub 78. Pivotally mounted in the slot in each rib 92, at opposite ends thereof and upon pivot pins 93, 93 are links 94, 95 that have their outer ends pivotally connected to an intermediate section 90 of the drum. Mounted in each rib-slot, immediately behind forward link 94, is an abutment 97 that prevents said forward link from tilting rearwardly of exact radial position. The arrangement is such that when the hub 91 and intermediate drum sections 90 are moved forwardly out of the operative plane of the drum, the said drum sections may be collapsed inwardly toward the axis of the drum by the forward tilting of the links 94, 95.

For effecting the forward tilting of said links 94, 95, a terminal sleeve 99 is slidably mounted upon the front end portion of spindle 76 for axial movement thereon, the rear end portion of said sleeve telescoping with the forward end of hub 91 in the expanded condition of the drum shown in Fig. 6. For effecting axial movement of the sleeve 99 relatively of spindle 76, an axial screw 100 is journaled in the forward end of said sleeve, beyond the end of the spindle, said screw being threaded through a nut 101 that is fixedly mounted in the spindle end. The forward end of screw 100 projects from the sleeve 99 and is squared to receive a suitable turning tool, such as a crank, by which the screw manually is rotated. In the medial region of its structure the sleeve 99 is formed with three radially projecting ears 102, 102, and pivotally connected to each ear 102 is a pair of links 103, 103, the other ends of said links being pivotally connected to a link 94, intermediate the ends thereof. The arrangement is such that when the sleeve 99 is moved forwardly on spindle 76, the links 103 tilt the links 94 forwardly to effect collapse of the intermediate drum sections 90. Reverse movement of the sleeve 99 restores said drum sections to expanded position. Near its rear end the sleeve 99 is formed with three radially extending fingers 104, 104 that are offset 60 degrees from the ears 102, and are in axial alignment with the rollers 87 on the respective links 81 of the key sections 77. The arrangement is such that during the restoring of the drum to operative condition, while the intermediate sections 90 are moving into the operative plane of the drum, the fingers 104 will engage the respective pairs of rollers 87, and by forcing them rearwardly, elevate the links 81, against the tension of springs 84, from the tilted positions shown in Fig. 8 to the radial positions shown in Fig. 6.

The front end of the drum is provided with a closure plate 106 that is similar to rear closure plate 88 except that its central region is offset to provide space for the ears 102 and links 103. The closure 106 is mounted upon the sleeve 99, and is removed therefrom during the collapsing and expanding of the drum.

The operation of the modified embodiment of the invention is very similar to the operation of the previously described embodiment. The drum is driven in the manner previously described, and when it is desired to collapse the drum, to remove a tire therefrom, the spindle 76 is moved forwardly as in the previously described embodiment. As the sleeve 99 on the spindle moves forwardly with the hub 91 and intermediate sections 90 carried by the latter, the fingers 104 on said sleeve tend to move away from the front links 81 of the key sections 77, but the springs 84, acting on rear links 82 of said key sections, tilt said rear links forwardly and thus draw the key sections inwardly toward the axis of the drum and away from the tire on the drum. As the sleeve 99 continues to move forwardly, the key sections 77 continue to move inwardly until the rear links 82 of the sections engage the respective abutments 86, which prevents further inward movement. In this position of the key sections, their greatest diameter is less than the bead diameter of the tire, now carried solely by the intermediate sections, so that said tire is carried forwardly of said key sections. As soon as the intermediate sections reach a point a sufficient distance in front of the key sections, the drive of the drum and feed of the spindle 76 is stopped. The operator then removes the closure plate 106 from the front of the drum, and applies a hand crank to the front end of screw 100. Rotation of the latter in the proper direction causes the sleeve 99 to feed forwardly, relatively of spindle 76, with the result that links 103 connected to said sleeve and to the front links 94 of the intermediate drum sections, effect a forward tilting of the latter so that the intermediate sections are moved inwardly toward the axis of the drum, as shown in Fig. 8. When the intermediate sections are fully collapsed, the finished tire casing easily is removed therefrom. The operations described are reversed to expand the drum to operative position. This completes a cycle of operation.

This embodiment of the invention is more positive in its action than that first described, and it does not utilize the centrifugal force of the rotating drum in its collapsing or expanding phases, nor is the operation of collapsing and expanding the drum affected thereby.

Other modification may be resorted to without departing from the spirit of the invention or the scope of the appended claims.

What is claimed is:

1. A collapsible sectional form for tire casings comprising two groups of form sections, means acting in cooperation with a tire casing on the form for moving both groups of sections laterally relatively of the operative plane of the form, and means for moving the sections of one of said groups, at least, toward the axis of the form simultaneously with their movement relatively of the operative plane of the form.

2. In a collapsible sectional tire building form, the combination of two groups of form sections, the sections of one of said groups, at least, being carried upon swingable links that carry the sections toward the axis of the drum when said links are tilted, means for moving the other group of sections axially, relatively of the first mentioned group, and means acting in cooperation with a tire casing on the form for tilting said links to effect collapsing movement of the one group of sections concurrently with the axial movement of the other group.

3. In an annular collapsible core, the combination of a group of key sections and a group of intermediate sections defining an annular structure when in operative position, and means for moving the intermediate sections as a group axially out of operative position, said means cooperating with a tire on said core for simultaneously moving the key sections inwardly toward the axis of the core.

4. In a collapsible tire building drum, the combination of a group of key sections and a group of intermediate sections, hub structures for the respective groups of sections, a plurality of links connecting each section to its hub in such a manner as to cause the sections to swing with a parallel motion from and toward the axis of the drum upon tilting of said links, and means for moving the intermediate sections axially as a unit out of the operative plane of the drum.

5. A combination as defined in claim 4 in which the last mentioned means operates through the agency of a tire on the core to tilt the links that support the key sections, to collapse the latter, simultaneously with the axial movement of the intermediate sections.

6. In a collapsible tire building drum, the combination of a group of key sections and a group of intermediate sections, hub structures for the respective groups of sections, a plurality of links connecting each section to its hub in the manner of a parallel motion device whereby the sections move from and toward the axis of the drum upon tilting of said links, means for moving the intermediate sections axially as a unit out of the operative plane of the drum, means for retaining the supporting links of the intermediate sections in erect position, and yielding means normally urging the supporting links of the key sections to tilted position.

7. A combination as defined in claim 6 including means constituting a part of the intermediate section assembly for forcing the key-section links to erect position against the force of the yielding means.

8. In a collapsible tire building drum, the combination of a group of key sections and a group of intermediate sections constituting a drum annulus, said sections comprising radially inwardly extending lateral marginal portions, end closures for the drum engaging the inner periphery of said lateral marginal portions, hub structures for the respective groups of sections, each of said hub structures carrying one of said end closures, and means connecting the sections to their respective hubs and permitting collapse of the sections by movement toward the axis of the drum while the end closures remain in fixed position with relation to the hubs.

9. A combination as defined in claim 8 including means for moving the intermediate sections, their supporting hub and the end closure thereon as a unit out of the operative plane of the drum.

10. A combination as defined in claim 8 including means on the perimeter of each end closure of the drum interlocking with the inner perimeter of the lateral marginal portions of the drum sections.

11. A combination as defined in claim 8 including manually operable latch means for securing the intermediate drum sections to the end closure that is mounted upon the hub that carries said sections.

12. In a collapsible tire building drum, the combination of a rotatable quill, a hub mounted thereon, a spindle mounted for axial movement interiorly of said quill, a driving connection between said hub and spindle for effecting rotation of the latter when the quill is rotated, a hub mounted upon the spindle, a group of drum sections mounted upon the quill-supported hub, a group of drum sections mounted upon the spindle-supported hub, and means for utilizing the drive of the quill for effecting axial movement of the spindle to move the drum sections carried thereby into or out of the operative plane of the drum.

13. A combination as defined in claim 12 in which the last mentioned means comprises a screw extending axially into the spindle, a nut secured to the spindle and threaded onto said screw, and means for maintaining the screw stationary as the quill and spindle are rotated to effect axial movement of the spindle longitudinally of the screw.

14. In a collapsible tire building drum, the combination of a group of key sections and a group of intermediate sections defining an annular structure when assembled in operative position, axially aligned hub structures for the respective groups of sections, a plurality of links supporting each drum section on its hub in such a manner as to cause said sections to swing with parallel motion from and toward the axis of the drum upon tilting of said links, said links including friction connections that prevent them from tilting under the action of gravity or centrifugal force, and means for moving the intermediate sections axially as a unit out of the operative plane of the drum while said links are in non-tilted position.

15. In a collapsible tire building drum, the combination of a group of key sections movable radially and axially of the axis of the drum while in parallelism therewith, during collapse of the drum, a group of intermediate sections movable axially out of the operative plane of the drum, and means for utilizing a tire built on the drum for imparting the said movement to the key sections simultaneously with the said movement of the intermediate sections.

16. In a collapsible tire building drum, the combination of a group of key sections and a group of intermediate sections, hub structures for the respective groups of sections, a plurality of links connecting each section to its hub in the manner of a parallel motion device whereby the sections move from or toward the axis of the drum upon the tilting of said links, means for moving the intermediate sections as a unit out of the operative plane of the drum, means for retaining the supporting links of the intermediate sections in erect position, and tension springs connected to one of each of the key sections supporting links normally urging the latter to tilted position.

17. A combination as defined in claim 16 in which the means for retaining the supporting links of the intermediate sections in erect position is manually operable to effect tilting of said links.

18. In a collapsible tire building drum, the combination of a group of key sections and a group of intermediate sections, axially aligned hub structures for the respective groups of sections, a plurality of links connecting each drum section to its hub in the manner of a parallel motion device whereby the sections move from or toward the axis of the drum upon tilting of said links, means for moving the intermediate sections as a unit axially into and out of the operative plane of the drum, yielding means normally urging the supporting links of the key section to tilted position, and an axial member that is manually movable axially, relatively of the hub of the intermediate sections for collapsing or expanding said intermediate sections, said member having link connection with supporting links of said intermediate sections.

19. A combination as defined in claim 18 in which the last mentioned member comprises means engageable with the key section links for moving them from tilted to erect position while the intermediate sections are being moved into the operative plane of the drum.

FRANK L. JOHNSON.